United States Patent
Akella et al.

(10) Patent No.: US 9,577,939 B2
(45) Date of Patent: Feb. 21, 2017

(54) METHOD AND APPARATUS FOR DISTRIBUTING ETHERCHANNEL LOAD BASED ON VARIANCE

(71) Applicant: Cisco Technology, Inc., San Jose, CA (US)

(72) Inventors: Anand Akella, Bangalore (IN); Sanjay Hooda, Cupertino, CA (US); Malik Maiga, Paris (FR); James Shen, San Jose, CA (US); Sheshendra Kumar, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 358 days.

(21) Appl. No.: 14/074,467

(22) Filed: Nov. 7, 2013

(65) Prior Publication Data

US 2015/0127809 A1 May 7, 2015

(51) Int. Cl.
*H04L 12/70* (2013.01)
*H04L 12/803* (2013.01)
*H04L 29/08* (2006.01)
*H04L 12/743* (2013.01)
*H04L 12/707* (2013.01)

(52) U.S. Cl.
CPC ......... *H04L 47/125* (2013.01); *H04L 45/7453* (2013.01); *H04L 67/1023* (2013.01); *H04L 45/24* (2013.01)

(58) Field of Classification Search
CPC ............................... H04L 12/803; H04L 29/08
USPC ......................................................... 709/224
See application file for complete search history.

(56) References Cited

U.S. PATENT DOCUMENTS

| | | | |
|---|---|---|---|
| 5,343,465 A * | 8/1994 | Khalil | H04L 12/26 370/232 |
| 6,667,975 B1 | 12/2003 | DeJager et al. | |
| 6,754,662 B1 * | 6/2004 | Li | G06F 17/30949 707/693 |
| 7,623,455 B2 | 11/2009 | Hilla et al. | |
| 8,553,584 B2 * | 10/2013 | Allan | H04L 49/35 370/255 |
| 8,644,156 B2 | 2/2014 | Rai et al. | |
| 2007/0171827 A1 * | 7/2007 | Scott | H04L 43/026 370/235 |
| 2008/0298236 A1 * | 12/2008 | Ervin | H04L 47/10 370/232 |
| 2009/0193105 A1 * | 7/2009 | Charny | H04L 45/30 709/223 |

(Continued)

*Primary Examiner* — Ario Etienne
*Assistant Examiner* — Elizabeth Kassa
(74) *Attorney, Agent, or Firm* — Patterson + Sheridan, LLP

(57) ABSTRACT

Techniques are disclosed for determining a preferred hashing algorithm for load balancing physical interface utilization in a network device, such as a switch, configured with a port-channel architecture. While a current hashing algorithm is being applied to network traffic flows, a forwarding engine of the network device retrieves snapshot data of each flow and evaluates the flows against other hashing algorithms. The forwarding engine, for each hashing algorithm result, calculates statistical measures, such as mean, variance, and coefficient of variation. These measures are used to determine the preferred hashing algorithm to subsequently be applied. Once determined, the networking device may notify a user (e.g., a system administrator) of the algorithm.

18 Claims, 6 Drawing Sheets

(56) References Cited

U.S. PATENT DOCUMENTS

| | | | |
|---|---|---|---|
| 2011/0243032 A1* | 10/2011 | Jenne | H04L 12/12 370/254 |
| 2012/0026878 A1* | 2/2012 | Scaglione | H04L 41/0816 370/235 |
| 2012/0320748 A1* | 12/2012 | Schmidtke | H04L 47/621 370/235 |
| 2013/0155902 A1* | 6/2013 | Feng | H04L 67/1031 370/255 |
| 2013/0308455 A1* | 11/2013 | Kapadia | H04L 47/125 370/235 |
| 2013/0343388 A1* | 12/2013 | Stroud | H04L 47/00 370/392 |
| 2014/0211621 A1* | 7/2014 | Sundaram | H04L 47/41 370/231 |

* cited by examiner

| Load Balancing Method | Physical Interfaces | Interface Utilization | Mean | Variance | Standard Deviation | Coefficient of Variation |
|---|---|---|---|---|---|---|
| src-dest mac address | Ethernet 1/1 | 0.7 | 0.575 | 0.08917 | 0.29861 | 0.519318054 |
| | Ethernet 1/2 | 0.2 | | | | |
| | Ethernet 1/3 | 0.9 | | | | |
| | Ethernet 1/4 | 0.5 | | | | |

505

| Load Balancing Method | Physical Interfaces | Interface Utilization | Mean | Variance | Standard Deviation | Coefficient of Variation |
|---|---|---|---|---|---|---|
| src mac address | Ethernet 1/1 | 0.5 | 0.475 | 0.0625 | 0.25 | 0.52632 |
| | Ethernet 1/2 | 0.4 | | | | |
| | Ethernet 1/3 | 0.8 | | | | |
| | Ethernet 1/4 | 0.2 | | | | |

510

| Load Balancing Method | Physical Interfaces | Interface Utilization | Mean | Variance | Standard Deviation | Coefficient of Variation |
|---|---|---|---|---|---|---|
| dest mac address | Ethernet 1/1 | 0.5 | 0.55 | 0.01667 | 0.12910 | 0.23473 |
| | Ethernet 1/2 | 0.6 | | | | |
| | Ethernet 1/3 | 0.4 | | | | |
| | Ethernet 1/4 | 0.7 | | | | |

METHOD AND APPARATUS FOR DISTRIBUTING ETHERCHANNEL LOAD BASED ON VARIANCE

TECHNICAL FIELD

The present disclosure generally relates to load balancing network traffic. More specifically, techniques are disclosed for load balancing port-channel traffic across multiple physical interfaces.

BACKGROUND

A port-channel architecture, such as EtherChannel, aggregates multiple physical Ethernet links into one logical Ethernet link to provide increased bandwidth and redundancy between switches, routers, and servers. Traffic may be balanced across the physical links using different algorithms. For example, a hashing algorithm may rely on characteristics of a traffic flow, such as source IP address, destination IP address, source MAC address, destination MAC address, etc., to assign a given flow to an interface of a port-channel. Typically, a forwarding engine on a network device running the port-channel supports one hashing algorithm. The algorithm evaluates a hash function, and the forwarding engine routes the channel traffic to the corresponding physical links based on the result.

However, hashing algorithms do not consider available bandwidth as a factor in load balancing traffic. For instance, a hashing algorithm may generate an identical hash result for two different flows. For example, consider a hashing algorithm that calculates an XOR of the source IP address and the destination IP address for each flow. Further, assume a first flow has a source IP address of 1.1.1.1 and a destination IP address of 1.1.1.2. The resulting hash after the XOR operation is 3, which may map to a physical link. However, if a second flow has a source IP address of 2.2.2.1 and a destination IP address of 2.2.2.2, the resulting hash for the second flow is also 3, which maps to the same physical link. As a result, the forwarding engine routes the two flows through the same physical link. Hashing under this algorithm may lead to uneven load sharing, underutilized bandwidth in other links, and dropped packets in the links where percentage utilization has reached 100%. More generally, the performance of an algorithm for assigning flows to interfaces in a port-channel can vary depending on the flows that actually occur.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. Note, however, that the appended drawings illustrate only typical embodiments of this disclosure and are therefore not to be considered limiting of its scope, for the disclosure may admit to other equally effective embodiments.

FIG. 5 illustrates three example load balancing methods that are evaluated under a minimal variance measure, according to one embodiment.

DESCRIPTION OF EXAMPLE EMBODIMENTS

Overview

Figure 1:
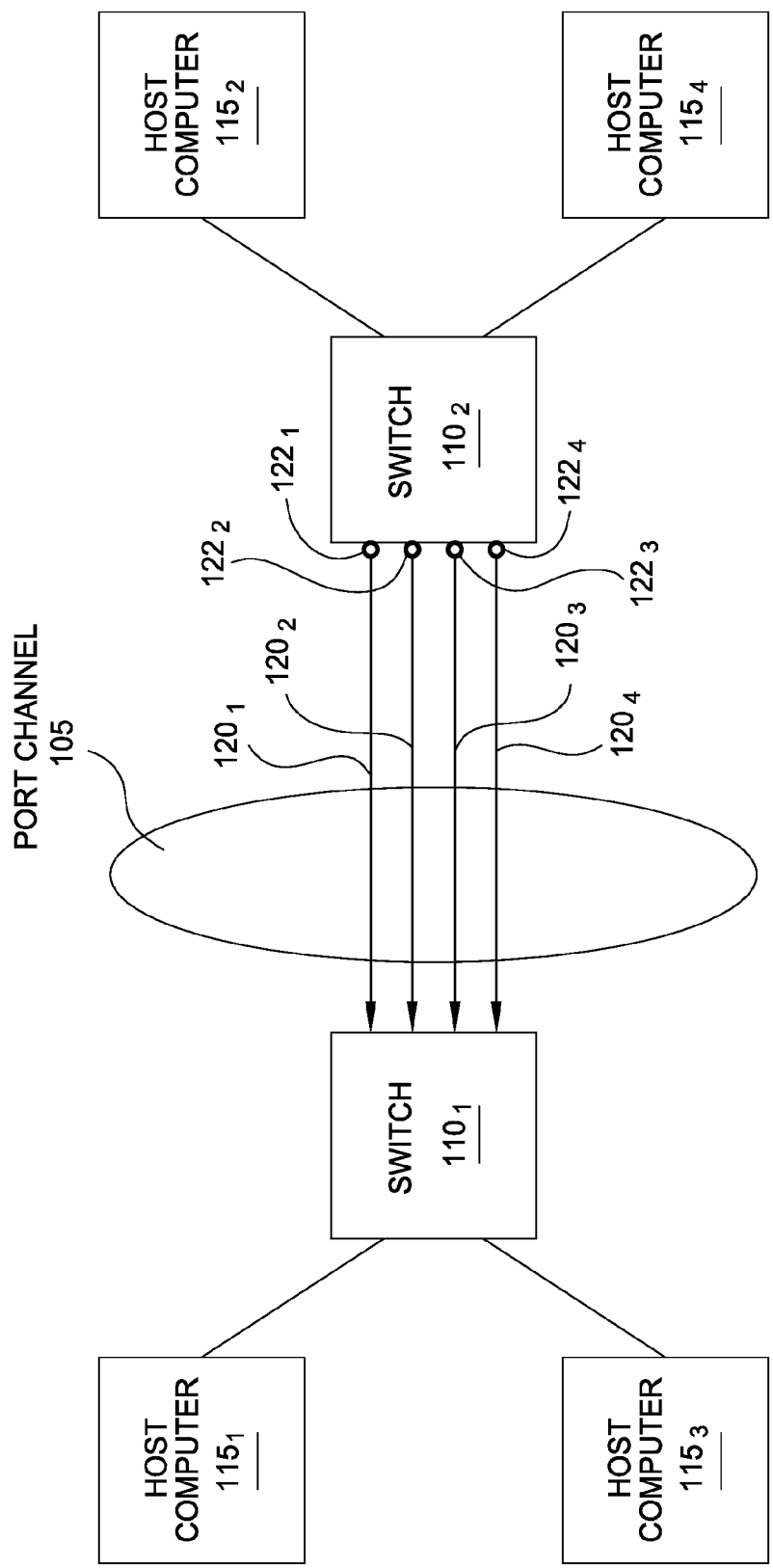
FIG. 1 illustrates an example computing environment, according to one embodiment.

One embodiment presented herein includes a method. The method generally includes evaluating, using one or more hashing algorithms, flow attributes of physical Ethernet connections of a networking device aggregating the physical Ethernet connections via port-channel. The method also generally includes calculating metrics for the flow attributes of each of the physical Ethernet connections based on the one or more hashing algorithms. The method also generally includes determining a preferred hashing algorithm from the one or more hashing algorithms based on the calculated metrics.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

Example Embodiments

Embodiments presented herein provide techniques for load balancing port-channel traffic based on flow variance. More specifically, embodiments disclose techniques for load balancing port-channel traffic that evaluate multiple hashing approaches without affecting traffic flow. In one embodiment, a networking device running the port-channel (e.g., a switch) retrieves percentage utilization values for each interface underlying a port-channel aggregation (referred to as channel members). The networking device determines flow characteristics for each channel member, such as source MAC address, destination MAC address, source IP address, destination IP address, source-destination IP address, ports, and the like. The networking device calculates the total bandwidth needed to transmit each channel member's flow. Using the flow characteristics and the total bandwidth, the networking device calculates the mean, variance, and coefficient of variation for each flow. Concurrently, the networking device evaluates several hashing algorithms to determine a preferred algorithm based on minimal variance without affecting traffic flow. After the networking determines the preferred hashing algorithm for the current traffic flows, the networking device may notify a user of the algorithm. In turn, an application provided by the networking device may prompt the user to decide whether to apply the algorithm. Alternatively, the networking device may be configured to automatically apply the preferred algorithm.

Advantageously, embodiments provide an approach to determine a preferred hashing algorithm based on currently available bandwidth to distribute port-channel traffic to physical network interfaces. Calculating the percentage utilization, variance, and coefficient of variation based on current network traffic flows allows the port-channel to determine a locally optimal or preferred hashing algorithm, based on percentage utilization that results from different hashing algorithms. In turn, this approach reduces variance in data streams among the physical links in the port-channel, resulting in even load balancing of traffic among channel members. Further, embodiments may be implemented in software in the networking device if the networking hardware itself does not provide support.

In the following description, numerous specific details are set forth to provide a more thorough understanding of the embodiments. However, it will be apparent to one of skill in the art embodiments of the present disclosure may be practiced without one or more of these specific details. In other instances, well-known features have not been described to avoid obscuring the embodiments.

FIG. 1 illustrates an example computing environment 100, according to one embodiment. As shown, the environment 100 includes a port-channel 105 configured to aggregate link traffic between networking devices, for example, such as between switches $110_{1-2}$. As shown, computing environment 100 also includes several host computers $115_{1-4}$. Illustratively, physical Ethernet links $120_{1-4}$ are connected via port adapters $122_{1-4}$ of switch $110_2$ to port-channel 105. Port-channel 105 may aggregate links $120_{1-4}$ (e.g., using a virtual MAC address) such that links $120_{1-4}$ appear as one logical link transmitting data to switch $110_1$.

Host computers 115 may communicate with each other over the network (e.g., host computer $115_2$ communicates with host computer $115_1$, host computer $115_4$ communicates with host computer $115_3$, etc.). Each connection between two host computers 115 via switches 110 generally uses one physical link 120. To determine which physical link 120 to use, a forwarding engine in switch $110_2$ uses hashing algorithms based on flow characteristics, e.g., IP addresses, MAC addresses, port numbers, etc., with each physical link having a value corresponding to an individual hash result. The forwarding engine may use a hashing algorithm that evaluates attributes of a traffic flow to determine which physical link 120 to assign a connection to. One example of a hashing algorithm is to perform an XOR operation on a source IP address and a destination IP address of the connection. The result may map the flow to one of the physical links, and the forwarding engine routes network traffic through that link.

This approach load balances network traffic flows across each physical link 120 but does not consider available bandwidth. For example, assume that three different flows have different source IP addresses and that the three flows are targeted to the same destination IP address. Further, assume the current hash algorithm is based on the source-destination IP address. In this case, it is possible that more than one flow yields the same hash result. Thus, it is possible that some Ethernet links will be used for sending traffic more than other links, resulting in high load variance.

Embodiments presented herein enable the forwarding engine of the switch $110_2$ to determine a preferred hash algorithm for routing network traffic through physical links 120. The forwarding engine evaluates different hashing algorithms and statistical measures created by each algorithm, such as mean, variance, and coefficient of variation. Such measures allow the forwarding engine to determine an algorithm that more evenly balances utilization across the physical links.

Figure 2:
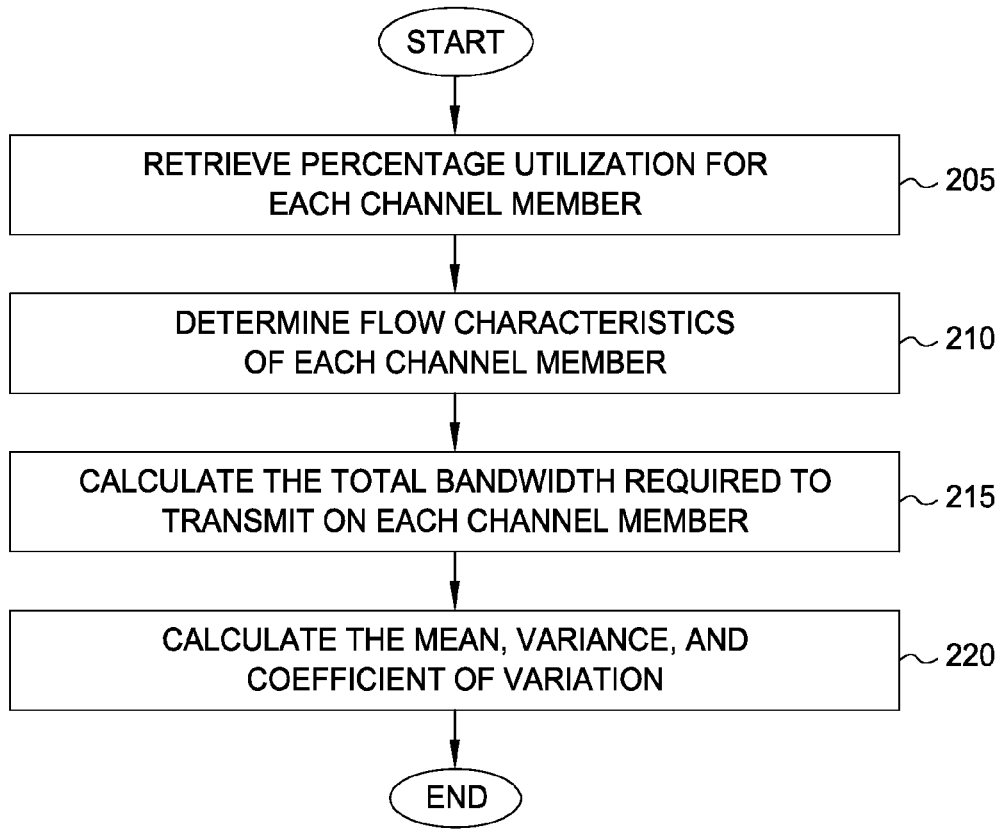
FIG. 2 illustrates a method for determining a preferred hashing algorithm, according to one embodiment.

FIG. 2 illustrates a method 200 for determining a hashing algorithm, according to one embodiment. For example, a forwarding engine of a switch collects values used to create statistics of traffic utilization accords the channel members of a port-channel. The statistics allow the forwarding engine to determine hashing algorithms that result in relatively balanced utilization for each physical link, based on the actual flows established on that switch. At step 205, the forwarding engine of the switch retrieves a percentage utilization for each physical link connected to the port-channel. The percentage utilization may be obtained, for example, by polling a port ASIC of each channel member.

At step 210, the forwarding engine determines the flow characteristics of each channel. A background process (or module residing in the switch) may retrieve the characteristics. For example, a module running in the switch may cache flow data, and the forwarding engine, in turn, determines the flow characteristics in the cache, such as port information, source IP and MAC addresses, and destination IP and MAC addresses. At step 215, the forwarding engine calculates the bandwidth required to transmit the flows for each channel. The module may also calculate the total bandwidth using the cached flow data. Alternatively, forwarding engine may poll a port ASIC for percentage utilization statistics for each channel member.

Figure 4:
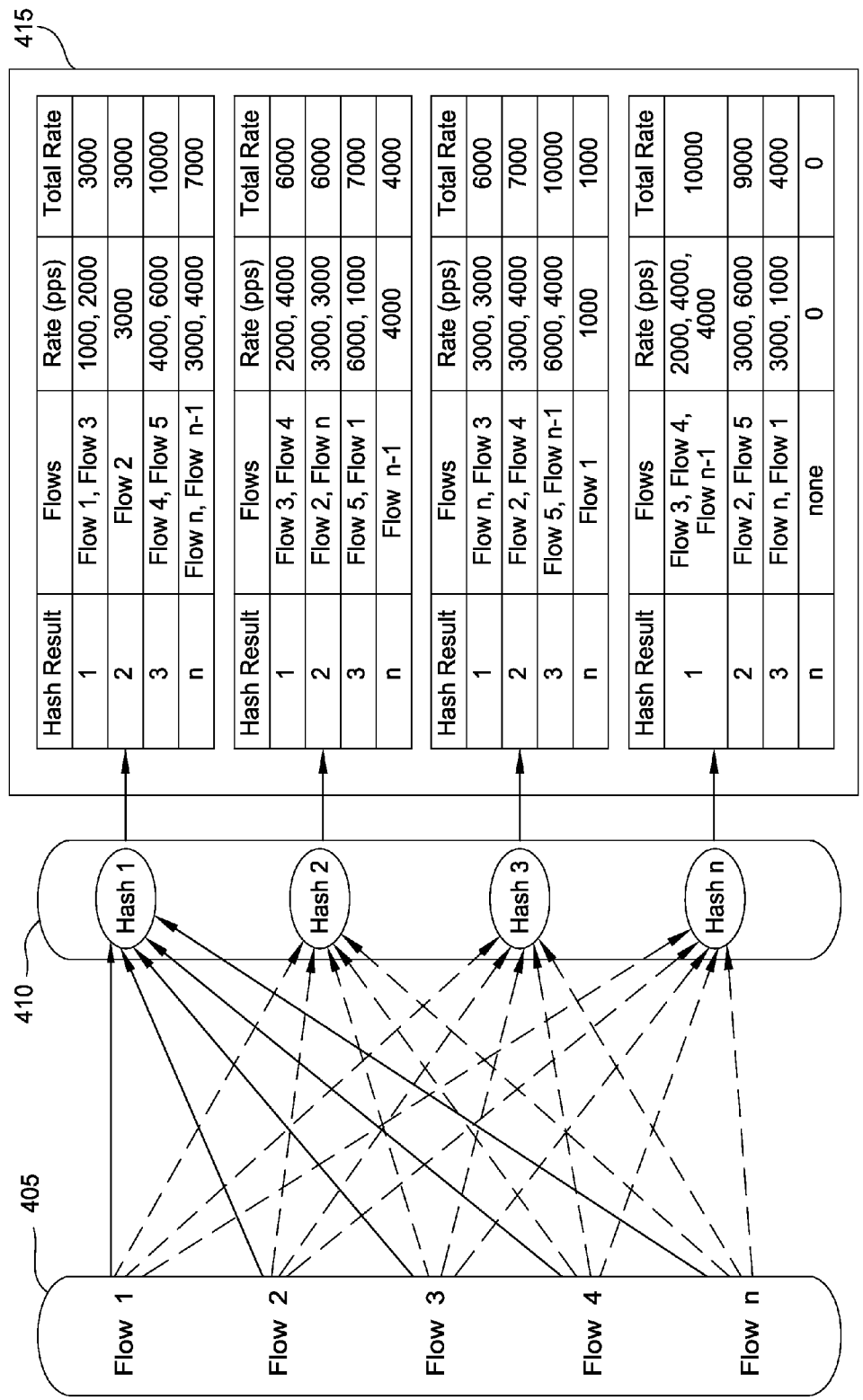
FIG. 4 illustrates an example use case, according to one embodiment.

In one embodiment, the forwarding engine stores the flow data and the corresponding hash result. FIG. 4, discussed below, provides an example of the stored data. At step 220, the switch calculates a mean, variance, and coefficient of variation. As is known, the coefficient of variation is a normalized measure of dispersion of a frequency distribution. To calculate these values, the percentage utilization of each channel member may be denoted as $P_u$ and the percentage available bandwidth of each channel member as $P_a$. The total percentage bandwidth for a channel member P is the sum of percentage utilization $P_u$ and the percentage available bandwidth $P_a$. That is:

$$P=P_u+P_a \quad (1)$$

The mean μ is the sum of the percentage utilization of the channel members divided by the total number of channel members n, or:

$$\mu=(\Sigma P_{u_i})\div n \quad (2)$$

The variance σ2 is:

$$\sigma 2=(\Sigma P_{u_i}-\mu)\div n \quad (3)$$

The coefficient of variation is the ratio of the standard deviation to the mean. The standard deviation a may be calculated as the square root of the variance. In other words:

$$\sigma=\sqrt{\sigma 2} \quad (4)$$

Thus, the coefficient of variation (CV) may be expressed as:

$$(CV)=\frac{\sigma}{\mu} \quad (5)$$

Generally, when the percentage utilization of each channel member is equal, the variance, standard of deviation, and coefficient of variation values equal 0. If the coefficient of variation is greater than 0.15, then the measured variance for a given algorithm is high. After calculating the values, the forwarding engine determines a preferred hashing algorithm.

Figure 3:
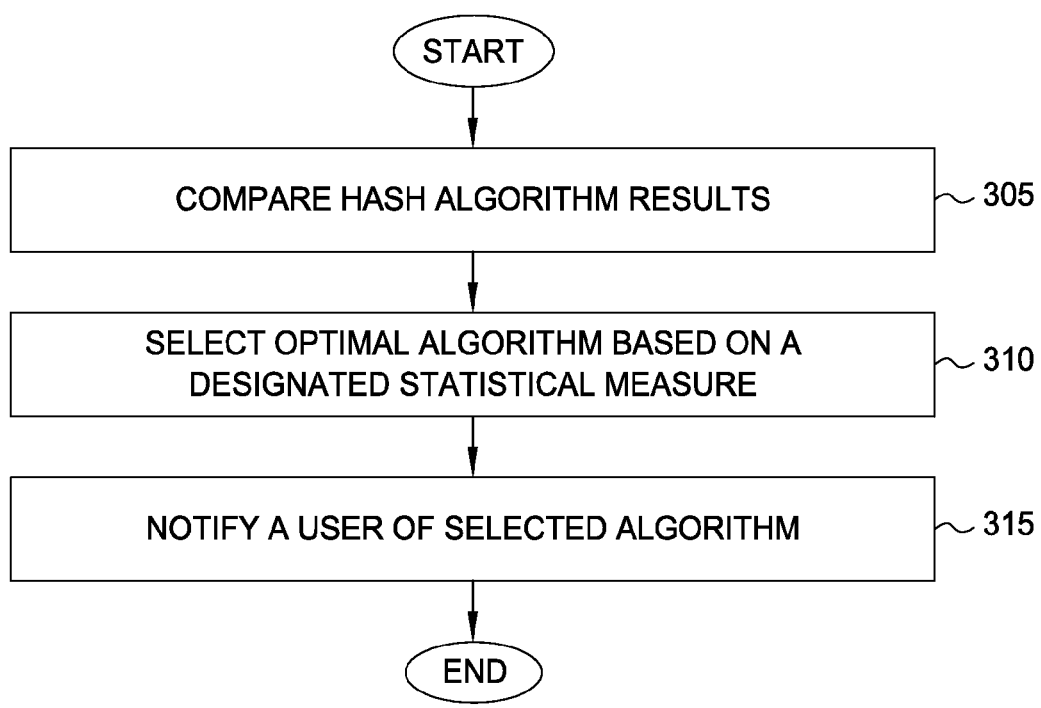
FIG. 3 illustrates determining a preferred hashing algorithm, according to one embodiment.

FIG. 3 illustrates a method 300 for determining a preferred hashing algorithm using current traffic localizations. That is, method 300 uses statistics derived from the current traffic flows in each channel to determine an algorithm that improves the overall usage balance based on the actual flows observed at the switch. At step 305, the forwarding engine compares results calculated using each hashing algorithm. The calculated results under each hashing algorithm yield a percentage utilization for each link as well as the mean, variance, standard deviation, and coefficient of variation of the given percentage utilizations. The forwarding engine may use the values corresponding to different hashing algorithms to compare the resulting load balance under each hashing algorithm.

At step 315, the forwarding engine selects a preferred algorithm by comparing the calculated measures between each hashing algorithm to determine an algorithm that results in a more optimally balanced utilization. The calculated measures, such as the variance and coefficient of variation, allows the forwarding engine to determine how balanced the utilization for each algorithm is across the physical links. For example, if the forwarding engine uses minimal variance as a measure to determine the preferred algorithm, then a scenario with the lowest variance is chosen.

If the calculated scenarios provide utilization measures relatively close to the mean value, then the resulting coefficient of variation measure is greater than 0 and less than 0.15. A zero value corresponds to the utilization of all physical interfaces being equal. In cases where the coefficient of variation is within the range of 0 and 0.15, determining a preferred algorithm based on the coefficient of variation may be preferable. For example, assume that three different load balancing scenarios provide coefficient of variation values of 0.11, 0.04, and 0.07 respectively. Because the coefficient of variation values each fall between 0 and 0.15, the forwarding engine may use the coefficient of variation to determine the preferred hashing algorithm. Consequently, the forwarding engine chooses a hashing algorithm corresponding to the second scenario because the coefficient of variation is closest to zero.

Note, coefficient of variation and minimal variance serve as reference examples of measures used to determine a preferred hashing algorithm. However, one of skill in the art will readily recognize that other values are applicable in context to determining a preferred hashing algorithm. For example, the entropy of a vector of percentage utilizations may also aid in determining a preferred algorithm to use in load balancing port-channel traffic. As another example, user input may also aid in determining a preferred algorithm.

At step 315, a module running in the switch may notify an administrator of an availability of a hashing algorithm that can improve utilization. The module may then prompt the user to select whether to apply the hashing algorithm. In one embodiment, the newly determined algorithm may require at least a minimal amount of improvement before the user is notified.

Additionally, some aspects of the process may be configured by the user. For example, the frequency at which the switch observes the flows in determining a preferred algorithm may be configured. In one embodiment, the switch may automatically apply the preferred algorithm to use in forwarding traffic through physical links. Of course, the switch may have a minimum threshold in load balance or utilization before the switch automatically applies the preferred hashing algorithm. The user may also configure how frequently the switch evaluates the hashing algorithms or how frequently the switch decides whether to change the hashing algorithm based on the statistical data and expected utilization of alternative hashing approaches.

FIG. 4 illustrates an example use case 400 where the forwarding engine generates results using several hashing algorithms, according to one embodiment. As stated, the forwarding engine retrieves percentage utilization values and flow characteristics for each channel member, i.e., for each physical link of a port-channel. After retrieving the data, the forwarding engine evaluates several algorithms using the data. Doing so allows the forwarding engine to determine a preferred algorithm based on the results.

As shown, the example use case 400 includes flows 1-n 405 being evaluated using hashing algorithms 1-n 410, without changing the algorithm currently being applied. After testing the different algorithms, the results 415 are output to a module in the forwarding engine. Illustratively, the types of results 415 may include the hash result as well flow metrics, such as flow identifiers, the rate of packets per second (pps), and the total rate for a given hash result. The forwarding engine uses results 415 to calculate statistics based on each algorithm. For instance, using the given values, the module in the forwarding engine may calculate mean, variance, and coefficient of variation measures corresponding to each locally observed traffic flow. These measures allow the forwarding engine to determine a preferred hashing algorithm based on the current traffic flows and addresses.

FIG. 5 illustrates three example load balancing methods that are evaluated using a minimal variance measure. Each scenario is presented as a table with columns for the load balancing method used, the physical interfaces used, the interface utilization for each interface, the mean, the variance, the standard deviation, and the coefficient of deviation.

Table 505 presents a scenario where the hashing algorithm applied to the port-channel is based on a source-destination MAC address. As shown, the interface utilization is unevenly balanced among each channel members. The physical links 1/1, 1/3, and 1/4 have a relatively high utilization, but 1/2 has a low utilization of 20%. The calculated variance in this scenario is 0.089.

Table 510 presents a scenario where the hashing algorithm applied to the port-channel is based on a source MAC address. The utilization for each physical links has a lesser variance than those in table 505. Likewise, the calculated variance in this scenario is 0.0625, which is less than the variance in the scenario of table 505. Further, table 515 presents a scenario where the hashing algorithm uses the destination MAC address. As shown, the calculated variance in this scenario is 0.01667.

Under the minimal variance measure, the scenario presented in table 515 provides the lowest variance, and thus, the forwarding engine selects the algorithm that is based on the destination MAC address.

Figure 6:
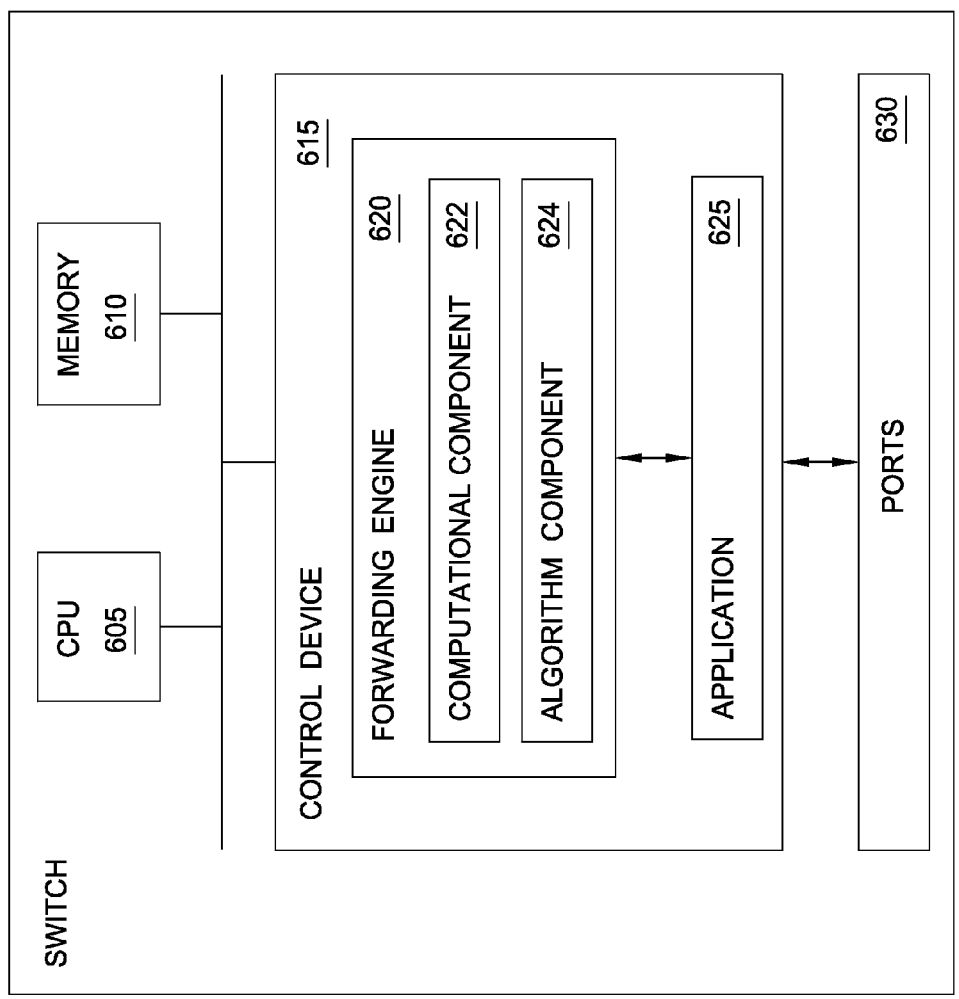
FIG. 6 illustrates an example switch configured to determine a preferred hashing algorithm, according to one embodiment.

FIG. 6 illustrates an example switch device 600 configured to determine a preferred hashing algorithm, according to one embodiment. Illustratively, switch 600 includes, without limitation, a control device 615 coupled to a central processing unit 605 and a memory 610 via a bus 612. Control device 615 is also coupled to multiple ports 630 (e.g., Ethernet ports). The components of switch 600 are provided for explanatory purposes. One of ordinary skill in the art will recognize that well known components and process operations have not been described in detail to avoid unnecessary obscuring of novel aspects of the disclosure. Further, in context of this disclosure, the computing elements shown in switch 600 may correspond to a physical device or may be a software-based (i.e., virtual) switch.

CPU 605 may retrieve and process network traffic. Control device 615 is responsible for many features of switch 600, such as packet parsing, packet forwarding, table lookups, buffer allocation, and time stamping. In some embodiments control device 615 is an application specific integrated circuit (ASIC). Control device 615 includes a forwarding engine 620. Forwarding engine 620 itself includes a computation component 622 and an algorithm component 624. Forwarding engine 620 makes forwarding decisions upon receiving flow data from the CPU. For example, in a port-channel configuration, forwarding engine 620 determines which physical link to route connections through based on a designated hashing algorithm. In assessing which hashing algorithm to use, computation component 622 calculates values resulting from using different hashing algorithms. An application 625 may provide computation component 622 network traffic data that allows computation component 622 additionally assess characteristics of the network traffic (e.g., total bandwidth, IP information, MAC information, port information, etc.). Algorithm component 624 determines, based on the values generated by computation component 622, a preferred hashing algorithm given current traffic localizations. Algorithm component 624 may determine the algorithm based on variance measures from each algorithm.

While the foregoing is directed to embodiments of the present disclosure, other and further embodiments of the disclosure may be devised without departing from the basic scope thereof. For example, aspects of the present disclosure may be implemented in hardware, software, or a combination of hardware and software. One embodiment of the disclosure may be implemented as a program product for use with a computer system. The program(s) of the program product define functions of the embodiments (including the methods described herein) and can be contained on a variety of computer-readable storage media. Illustrative non-transitory computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., a hard-disk drive or any type of solid-state random-access semiconductor memory) on which alterable information is stored. Such computer-readable storage media, when carrying computer-readable instructions that direct the functions of the present disclosure, are embodiments of the present disclosure.

Although certain embodiments may achieve advantages over other possible solutions and/or over the prior art, whether a particular advantage is achieved by a given embodiment is not limiting. Thus, the following aspects, features, embodiments and advantages are merely illustrative and are not considered elements or limitations of the appended claims except where explicitly recited in a claim(s).

Aspects of the present disclosure may be embodied as a system, method or computer program product. Accordingly, embodiments presented herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible or otherwise non-transitory medium that can contain, or store a program for use by or in connection with an instruction execution system, apparatus or device.

The flowchart and block diagrams in the Figures illustrate the architecture, functionality, and operation of possible implementations of systems, methods, and computer program products according to various embodiments presented herein. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments disclosed herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources. A user can access any of the resources that reside in the cloud at any time, and from anywhere across the Internet.

In view of the foregoing, the scope of the present disclosure is determined by the claims that follow.

What is claimed is:
1. A computer-implemented method, comprising:
retrieving, from each of a plurality of physical Ethernet connections of a networking device aggregating the physical Ethernet connections via a port-channel, a percentage utilization of the physical Ethernet connection;
evaluating, using one or more hashing algorithms, flow attributes of each of the physical Ethernet connections;
calculating metrics for the flow attributes of each of the physical Ethernet connections based on the hashing algorithms and the percentage utilization of each of the physical Ethernet connections;
selecting a preferred hashing algorithm based on the calculated metrics;

estimating an improvement to the percentage utilization that results from using the preferred hashing algorithm on each of the physical Ethernet connections; and upon determining that the improvement that results from performing the preferred hashing algorithm exceeds a specified threshold, (i) sending a notification of the preferred hashing algorithm to a user and (ii) prompting the user to indicate whether to apply the preferred hashing algorithm.

2. The method of claim 1, wherein the flow attributes includes a source IP address, a destination IP address, a source MAC address, and a destination MAC address.

3. The method of claim 1, wherein the metrics include a mean, a variance, a standard deviation, and a coefficient of variation.

4. The method of claim 3, wherein the coefficient of variation is $\sigma \div \mu$, where $\sigma$ is the standard deviation and $\mu$ is the mean.

5. The method of claim 3, wherein the preferred hashing algorithm is determined using the coefficient of variation.

6. The method of claim 3, wherein the preferred hashing algorithm is determined using a minimal variance measure.

7. A non-transitory computer-readable storage medium storing code for execution by a processor, wherein the code, when executed by a processor, performs an operation, the operation comprising:

retrieving, from each of a plurality of physical Ethernet connections of a networking device aggregating the physical Ethernet connections via a port-channel, a percentage utilization of the physical Ethernet connection;

evaluating, using one or more hashing algorithms, flow attributes of each of the physical Ethernet connections;

calculating metrics for the flow attributes of each of the physical Ethernet connections based on the hashing algorithms and the percentage utilization of each of the physical Ethernet connections;

selecting a preferred hashing algorithm based on the calculated metrics;

estimating an improvement to the percentage utilization that results from using the preferred hashing algorithm on each of the physical Ethernet connections; and upon determining that the improvement that results from performing the preferred hashing algorithm exceeds a specified threshold, (i) sending a notification of the preferred hashing algorithm to a user and (ii) prompting the user to indicate whether to apply the preferred hashing algorithm.

8. The computer-readable storage medium of claim 7, wherein the flow attributes includes a source IP address, a destination IP address, a source MAC address, and a destination MAC address.

9. The computer-readable storage medium of claim 7, wherein the metrics include a mean, a variance, a standard deviation, and a coefficient of variation.

10. The computer-readable storage medium of claim 9, wherein the coefficient of variation is $\sigma \pm \mu$, where $\sigma$ is the standard deviation and $\mu$ is the mean.

11. The computer-readable storage medium of claim 9, wherein the preferred hashing algorithm is determined using the coefficient of variation.

12. The computer-readable storage medium of claim 9, wherein the preferred hashing algorithm is determined using a minimal variance measure.

13. A system, comprising:

a processor; and a memory hosting an application, which, when executed on the processor, performs an operation, the operation comprising:

retrieving, from each of a plurality of physical Ethernet connections of a networking device aggregating the physical Ethernet connections via a port-channel, a percentage utilization of the physical Ethernet connection;

evaluating, using one or more hashing algorithms, flow attributes of each of the physical Ethernet connections;

calculating metrics for the flow attributes of each of the physical Ethernet connections based on the hashing algorithms and the percentage utilization of each of the physical Ethernet connections;

selecting a preferred hashing algorithm based on the calculated metrics;

estimating an improvement to the percentage utilization that results from using the preferred hashing algorithm on each of the physical Ethernet connections; and upon determining that the improvement that results from performing the preferred hashing algorithm exceeds a specified threshold, (i) sending a notification of the preferred hashing algorithm to a user and (ii) prompting the user to indicate whether to apply the preferred hashing algorithm.

14. The system of claim 13, wherein the flow attributes includes a source IP address, a destination IP address, a source MAC address, and a destination MAC address.

15. The system of claim 13, wherein the metrics include a mean, a variance, a standard deviation, and a coefficient of variation.

16. The system of claim 15, wherein the coefficient of variation is $\sigma \pm \mu$, where $\sigma$ is the standard deviation and $\mu$ is the mean.

17. The system of claim 15, wherein the preferred hashing algorithm is determined using the coefficient of variation.

18. The system of claim 15, wherein the preferred hashing algorithm is determined using a minimal variance measure.

* * * * *

UNITED STATES PATENT AND TRADEMARK OFFICE
CERTIFICATE OF CORRECTION

PATENT NO. : 9,577,939 B2
APPLICATION NO. : 14/074467
DATED : February 21, 2017
INVENTOR(S) : Akella et al.

Page 1 of 1

It is certified that error appears in the above-identified patent and that said Letters Patent is hereby corrected as shown below:

In the Claims

Column 10, Line 2, Claim 10, delete "$\sigma \pm \mu$," and insert -- $\sigma \div \mu$, --, therefor.

Column 10, Line 48, Claim 16, delete "$\sigma \pm \mu$," and insert -- $\sigma \div \mu$, --, therefor.

Signed and Sealed this
Sixth Day of June, 2017

Michelle K. Lee
*Director of the United States Patent and Trademark Office*